(12) United States Patent
Lessing et al.

(10) Patent No.: US 10,112,310 B2
(45) Date of Patent: Oct. 30, 2018

(54) FOOD HANDLING GRIPPER

(71) Applicant: Soft Robotics, Inc., Cambridge, MA (US)

(72) Inventors: Joshua Aaron Lessing, Cambridge, MA (US); Ryan Richard Knopf, Cambridge, MA (US); Daniel Vincent Harburg, Brookline, MA (US); Kevin Alcedo, Coral Springs, FL (US); Grant Thomas Sellers, Cambridge, MA (US); Mark Chiappetta, Westford, MA (US)

(73) Assignee: SOFT ROBOTICS, INC., Cambridge, MA (US)

( * ) Notice: Subject to any disclaimer, the term of this patent is extended or adjusted under 35 U.S.C. 154(b) by 306 days.

(21) Appl. No.: 15/194,283

(22) Filed: Jun. 27, 2016

(65) Prior Publication Data

US 2016/0375590 A1  Dec. 29, 2016

Related U.S. Application Data

(60) Provisional application No. 62/185,385, filed on Jun. 26, 2015.

(51) Int. Cl.
*B25J 15/12* (2006.01)
*B25J 15/00* (2006.01)
*B25J 15/10* (2006.01)

(52) U.S. Cl.
CPC ............ *B25J 15/12* (2013.01); *B25J 15/0023* (2013.01); *B25J 15/10* (2013.01); *Y10S 901/39* (2013.01)

(58) Field of Classification Search
CPC ........ B25J 15/12; B25J 15/0023; B25J 15/10; B25J 9/142; B25J 15/103; Y10S 901/39; B66C 1/46; B65G 47/908; F15B 15/103

USPC .................................. 294/196, 208, 119.3
See application file for complete search history.

(56) References Cited

U.S. PATENT DOCUMENTS

| 3,343,864 | A |   | 9/1967  | Baer |
|---|---|---|---|---|
| 3,640,564 | A |   | 2/1972  | Kuster |
| 4,830,565 | A | * | 5/1989  | Bucher .................. B25J 15/103 294/115 |
| 5,156,081 | A |   | 10/1992 | Suzumori |
| 5,251,538 | A |   | 10/1993 | Smith |
| 7,617,762 | B1 |  | 11/2009 | Ragner |
| 2002/0157388 | A1 | | 10/2002 | Seto et al. |

(Continued)

FOREIGN PATENT DOCUMENTS

| GB | 2088823 A | * | 6/1982 | ............... B66C 1/46 |
|---|---|---|---|---|
| GB | 2237552 A | * | 8/1991 | |

(Continued)

OTHER PUBLICATIONS

International Search Report and Written Opinion of PCT/US2016/039648 dated: Oct. 28, 2016, 12 pages.

*Primary Examiner* — Gabriela M Puig

(57) ABSTRACT

Exemplary embodiments relate to improvements in robotic systems to reduce biological or chemical harborage points on the systems. For example, in exemplary embodiments, robotic actuators, hubs, or entire robotic systems may be configured to allow crevices along joints or near fasteners to be reduced or eliminated, hard corners to be replaced with rounded edges, certain components or harborage points to be eliminated, shapes to be reconfigured to be smoother or flat, and/or or surfaces to be reconfigurable for simpler cleaning.

12 Claims, 21 Drawing Sheets

(56) References Cited

U.S. PATENT DOCUMENTS

| | | |
|---|---|---|
| 2005/0081711 A1 | 4/2005 | Kerekes et al. |
| 2009/0030562 A1 | 1/2009 | Jacobsen et al. |
| 2014/0360358 A1* | 12/2014 | Tell .......................... F16J 3/043 |
| | | 92/174 |
| 2015/0090113 A1 | 4/2015 | Galloway |
| 2015/0257839 A1* | 9/2015 | Vause ............... A61B 17/22032 |
| | | 606/130 |
| 2016/0075036 A1* | 3/2016 | Lessing ................... B25J 15/12 |
| | | 361/234 |
| 2016/0114482 A1* | 4/2016 | Lessing .................. A61B 34/30 |
| | | 606/130 |
| 2017/0157780 A1* | 6/2017 | Zhang ...................... B25J 15/12 |
| 2018/0087545 A1* | 3/2018 | Mankau ................ F15B 15/103 |

FOREIGN PATENT DOCUMENTS

| | | | |
|---|---|---|---|
| JP | 03092282 A * | 4/1991 | |
| SU | 1364470 A1 * | 1/1988 | ............. B25J 15/12 |
| WO | 20140138123 A1 | 9/2014 | |

* cited by examiner

FOOD HANDLING GRIPPER

RELATED APPLICATIONS

This application claims priority to U.S. Provisional Patent Application Ser. No. 62/185,385, filed on Jun. 26, 2015 and entitled "Food Handling Gripper." The contents of the aforementioned application are incorporated herein by reference.

BACKGROUND

Robotic systems are employed in a number of different contexts, and may be called upon to perform a wide variety of different tasks. Robots typically manipulate objects around them using robotic manipulators such as individual actuators, grippers, or end effectors.

Soft robotic actuators have recently been employed in contexts in which traditional hard actuators may be inappropriate or may suffer from deficiencies. For example, in food handling, it may be advantageous to use soft robotic actuators because of their improved ability to conform to the article being grasped, thus preventing the food from becoming marred or bruised. For similar reasons, soft actuators may be used in medical settings.

Whether a hard robotic actuator or a soft robotic actuator is employed, the handling of certain biological or chemical materials may pose unique problems. Hard and soft robotic systems may include numerous crevices, surface roughness, indentations, fasteners, and other areas where the biological or chemical materials may accumulate and breed bacteria or spread potentially poisonous matter to other products. Traditionally, it may be difficult to remove accumulated biological or chemical materials, thus creating a contamination hazard.

SUMMARY

The present application addresses improvements in robotic systems to reduce biological or chemical harborage points on the systems. Exemplary embodiments relate to improvements in robotic actuators, grippers, hubs for connecting the actuators or grippers to a robotic arm, entire robotic systems, and other components. According to exemplary embodiments, fasteners and mounting points may be moved to internal locations on actuators and hubs, so as to present a smooth, flat surface without corners, crevices, or other points for biological or chemical materials to accumulate. Attachment points may be configured to use twist-interlock systems having rounded interlocking pieces that are easier to clean than sharp corners. Distances between adjacent components (e.g., accordion extensions on actuators) may be increased, and curves added or increased in size, to reduce harborage points. Similarly, specially-configured coverings may be employed to present a flat surface on which biological or chemical materials will exhibit reduced accumulation or which may be readily cleaned; in some embodiments, the coverings may be disposable.

Moreover, some embodiments provide actuators having improved designs for handling food, biological materials such as tissue, and other delicate or easily bruised or deformed materials.

Although exemplary embodiments are described in connection with soft robotic actuators, similar techniques may be employed with more traditional hard robotic systems.

DETAILED DESCRIPTION

Figure 1A:
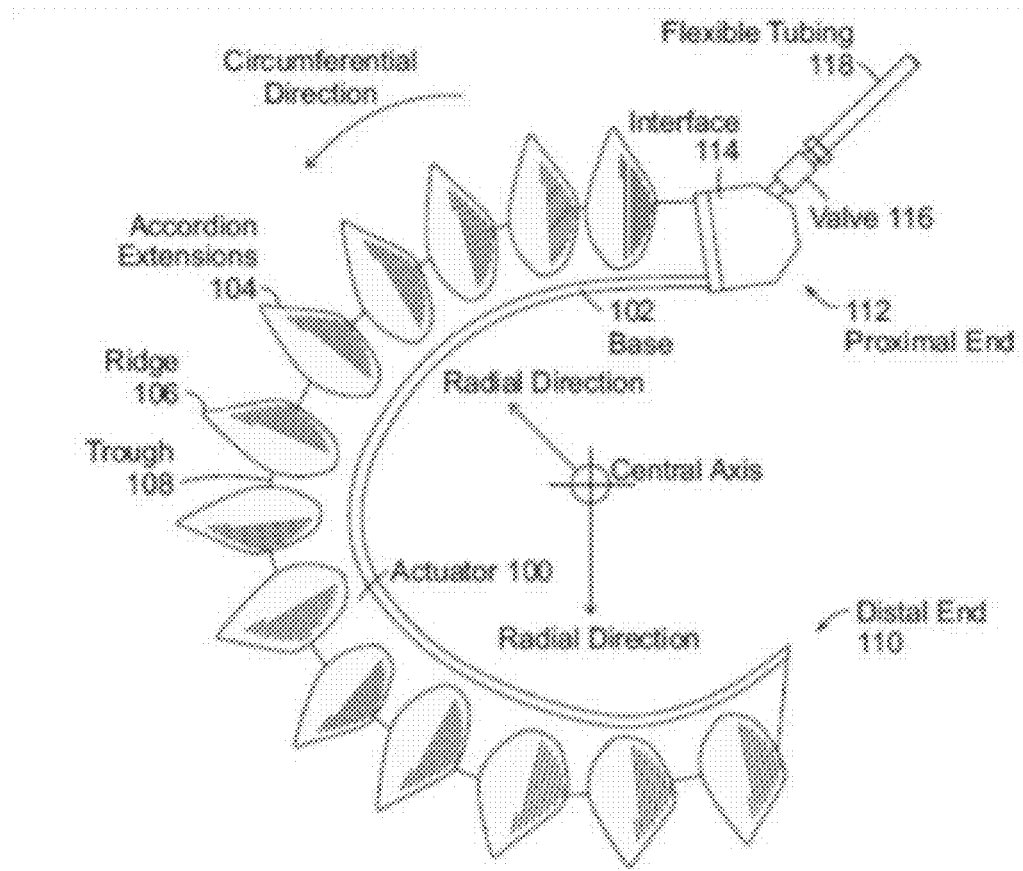
FIGS. 1A-1D depict exemplary soft robotic actuators suitable for use with exemplary embodiments described herein.

Exemplary embodiments relate to robotic systems that are designed or configured to reduce biological or chemical harborage points on the systems. For example, in exemplary embodiments, robotic actuators, hubs, or entire robotic systems may be configured to allow crevices along joints or near fasteners to be reduced or eliminated, hard corners to be replaced with rounded edges, certain components or harborage points to be eliminated, shapes to be reconfigured to be smoother or flat, and/or or surfaces to be reconfigurable for simpler cleaning. Improved actuator designs for handling certain types of biological or chemical materials are also disclosed.

Exemplary embodiments may be advantageously employed in conjunction with soft robotic actuators. Soft robotic actuators are relatively non-rigid actuators that may be actuated by, for example, by filling the actuator with a fluid such as air or water. The soft actuator may be configured so that, by varying the pressure of the fluid in the actuator, the shape of the actuator changes. Accordingly, the actuator can be made to, for instance, wrap around an object. Because the soft actuator is relatively non-rigid, the actuator may better conform to the surface of the grasped object, allowing the actuator to gain a better hold on the object or more gently hold fragile objects.

A brief overview of soft robotic actuators and grippers will first be provided, followed by a detailed description of various aspects of exemplary embodiments. Unless otherwise noted, it is contemplated that each of the described embodiments may be used in any combination with each other.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, twist and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
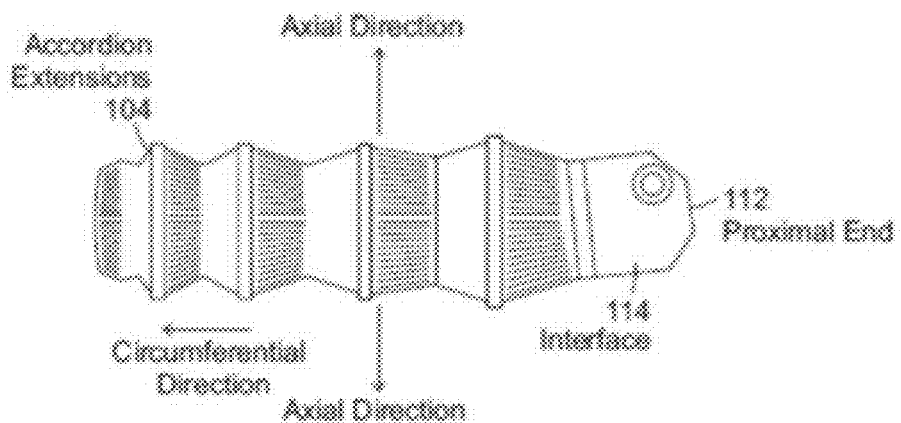
Figure 1C:
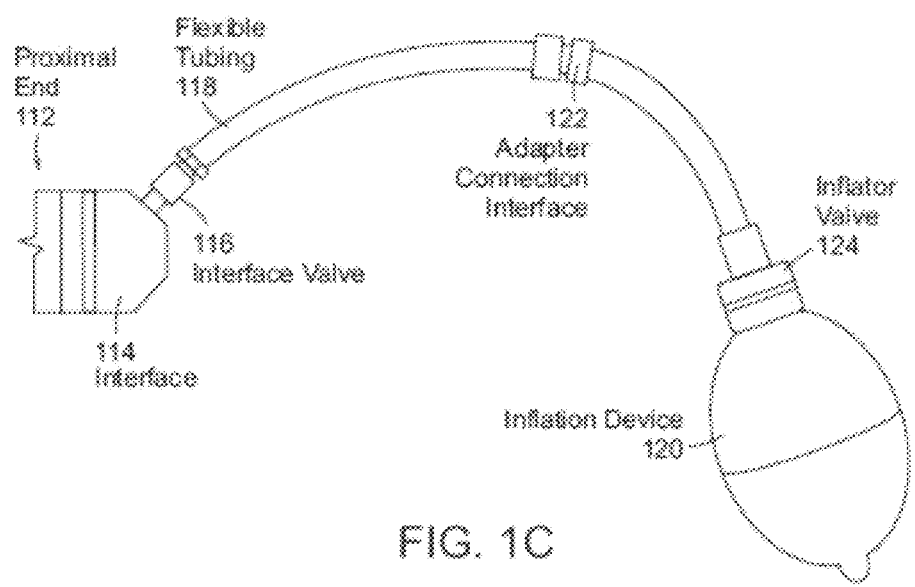
Figure 1D:
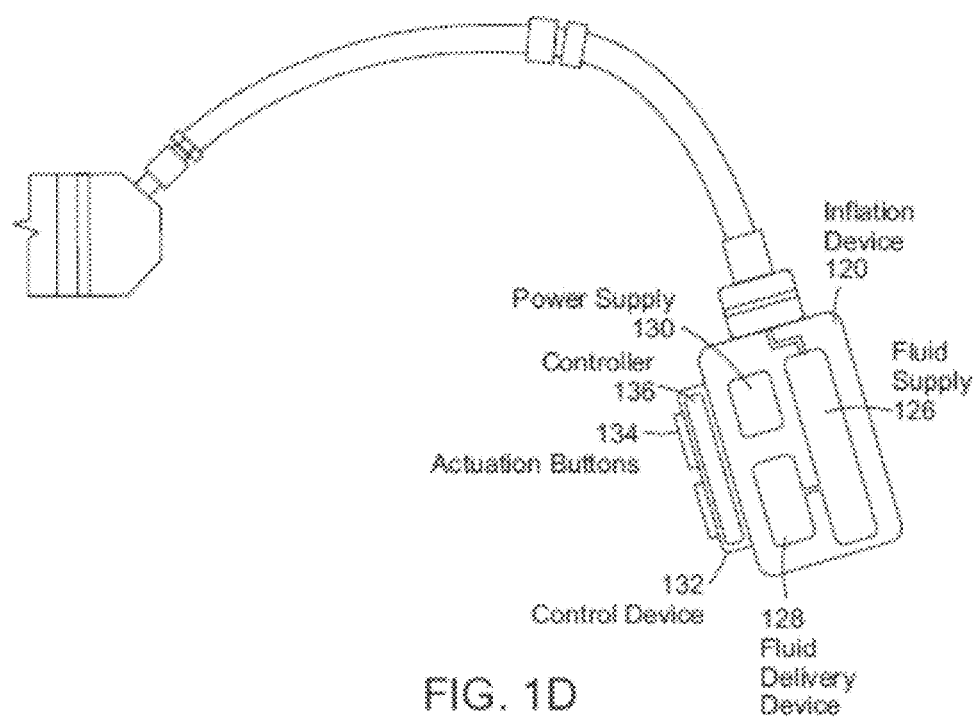

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The elastomeric materials may also be a fluoropolymer elastomer for chemical resistance. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of a robotic system. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

As used herein, an actuator typically refers to a single component resembling the actuator 100. When multiple actuators are employed together to form a gripping system that grips a target, such a system is generally referred to as a gripper (although some grippers may consist of a single actuator that grips a target in isolation).

Hubs and Mounting Points

Actuators or grippers may be mounted to a robotic arm (for example) either directly or through a separate interface such as a hub. Problematically, the connection between various components may include crevices or corners that accumulate materials and may be difficult to clean.

It is noted that actuators, grippers, and robotic systems may be cleaned in-place or out-of-place. In-place cleaning generally refers to cleaning some or all of a robotic system while the various parts of the system are still connected, without disassembly. For example, in-place cleaning may involve scrubbing an actuator and gripper assembly while the assembly remains mounted to a robotic arm. Out-of-place cleaning generally involves disassembling the assembly to clean the parts individually and/or access internal areas of the parts. Exemplary embodiments provide hubs and mounting locations having fewer or smaller harborage points (thus collecting less bacterial, biological, or chemical material). Moreover, exemplary embodiments are easier to clean in-place or disassemble for out-of-place cleaning, as described below.

Figure 2A:
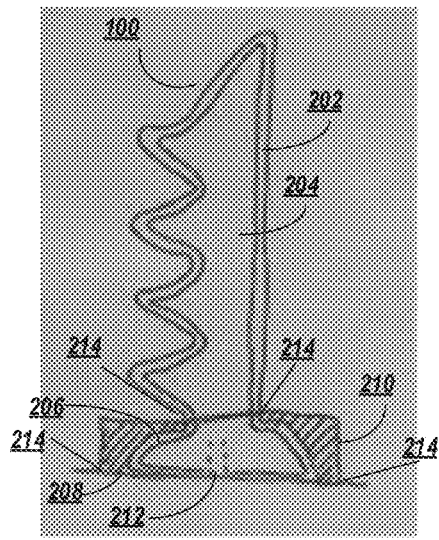
FIGS. 2A-2E depict examples of internal attachment mechanisms for affixing an actuator to a hub according to an exemplary embodiment.

FIGS. 2A-2E depict examples of internal attachment mechanisms for affixing an actuator to a hub according to an exemplary embodiment. FIG. 2A depicts an internal cross-sectional view of a configuration for an attachment point for an actuator 100 that includes several harborage points.

The actuator 100 has a wall 202 made of an elastomeric material that surrounds an internal void 204 configured to be filled with an inflation fluid. At the proximal end of the actuator 100, a flared section 206 is placed flush with a mounting surface 208, which may be (for example) an interface to a gripper to be mounted on a robotic arm. A collar 210 may be snapped around the flared section 206 and secured to the mounting surface 208. For example, the collar 210 may be fixed to the mounting surface 208 using a fastening mechanism, such as screws or bolts. An inflation fluid supply path 212 extends through the mounting surface 208, the collar 210, and into the void 204 to supply inflation fluid to the actuator 100.

At various locations in this configuration, harborage points 214 exist where chemical or biological material may accumulate and encourage bacterial growth. For example, harborage points 214 exist at the interface between the actuator 100 and the collar 210, where sharp corners and crevices allow biological or chemical matter to accumulate. Similarly, harborage points 214 exist at the base of the collar 210, where the collar 210 meets the mounting surface 208.

Furthermore, the actuator 100 is configured to bend when inflated, deflated, or subjected to vacuum. As the actuator 100 bends (e.g., to the left or right in FIG. 2A), a gap forms between the internal face of the collar 210 and the external face of the flared section 206 (and any other portion of the actuator 100 surrounded by the collar 210). This gap can quickly become filled with biological or chemical material and may include a number of harborage points. Moreover, this gap is difficult to access with cleaning tools while the actuator 100 is affixed to the mounting surface 208, making in-place cleaning difficult or impossible.

Figure 2B:
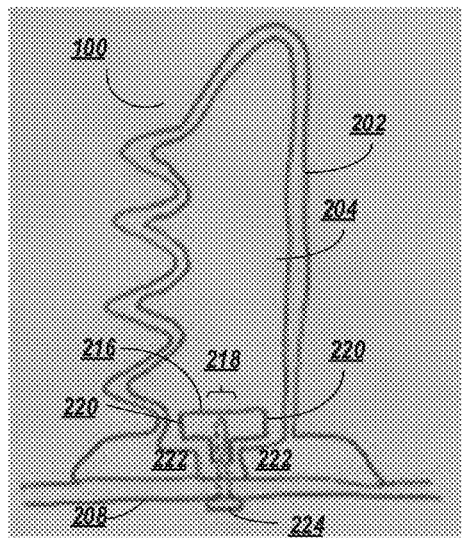
Figure 2C:
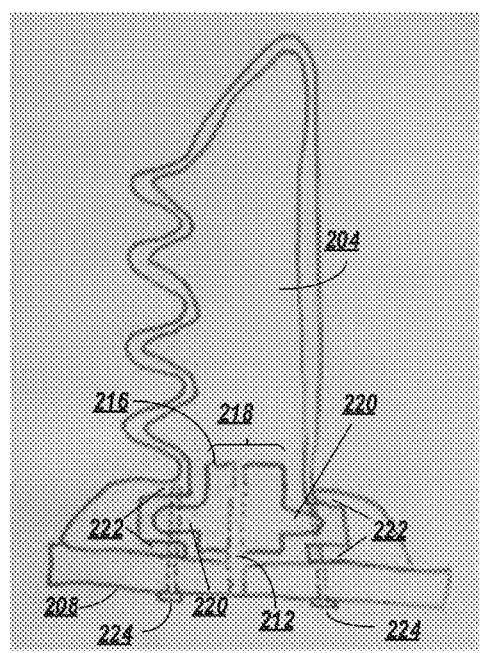

An improved actuator configuration is depicted in FIG. 2B. In this exemplary embodiment, the actuator 100 is secured to the mounting surface 208 using a securing mechanism 216. The securing mechanism 216 includes a central body 218 and one or more extensions 220 extending from the central body 218. The extensions 220 are positioned above one or more ledges 222 formed in the wall 202 of the actuator 100, with a gap existing to allow a fastening mechanism 224 (e.g., a bolt or screw) to be inserted through the mounting surface 208 and into a corresponding hole in the body 218 of the securing mechanism 216. When the fastening mechanism 224 is tightened, the extensions 220 are drawn into the ledges 222 and compress the elastomeric material, forming a fluid-tight gasket and a circumferential seal with the mounting surface 208 around the proximal end of the actuator 100. Preferably, the extensions 220 extend as far as possible in order to provide increased surface area for forming the gasket.

The securing mechanism 216 may be made of any suitable material, such as plastic or metal.

As can be seen in FIG. 2B, due to the absence of a collar the number of harborage points is reduced. In some embodiments, the portion of the flared section 206 that contacts the mounting surface 208 extends at substantially a 90° angle away from the mounting surface 208. As a result, the force exerted by the securing mechanism 216 pushes the flared portion 206 downward, which forms a relatively strong seal with the mounting surface 208 and reduces the area of the gap between the actuator 100 and the mounting surface 208. Thus, harborage points are reduced in the system.

In some cases, if bacteria should accumulate at the interface between the actuator 100 and the mounting surface 208, the actuator 100 may be removed from the mounting surface 208 by removing the fastening mechanism 224, and the actuator 100 may be cleaned (e.g., in a dishwasher or an autoclave, if made of suitable materials). Because the mounting surface is typically flat, it is also relatively easy to clean.

In some embodiments, the securing mechanism 216 may include an inflation fluid passage allowing inflation fluid to pass through the securing mechanism. The inflation fluid passage may pass through the central body 218 along with the fastening mechanism 224, or the inflation fluid passage and the fastening mechanism may be provided on different parts of the securing mechanism 216, as shown in the configuration depicted in FIG. 2C. In this example, the inflation fluid passage 212 extends through the body 218 of the securing mechanism 216. The securing mechanism 216 is provided with holes in the extensions 220 for receiving fastening mechanisms 224. The ledges 222 in this example include a lower ledge situated below the extensions 220 and an upper ledge provided above the extensions 220.

Figure 2D:
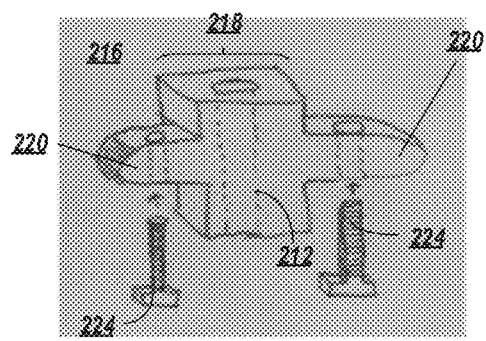

The fastening mechanisms 224 are inserted through the mounting surface 208 and through a hole in the lower ledge. The fastening mechanisms 224 then extend through the corresponding hole in the extensions 220. In some embodiments, the fastening mechanisms 224 terminate in the extensions 220; in others, the fastening mechanisms 224 penetrate the extensions 220 and extend into hardware overmolded into the upper ledge. When the fastening mechanisms are tightened, the lower ledge (and the upper ledge, if the fastening mechanism extends into it) is drawn tight with the extensions 220, creating a fluid-tight gasket. Inflation fluid is supplied to the void 204 through the inflation fluid supply passage 212. FIG. 2D depicts the securing mechanism 216 of this embodiment in more detail.

The securing mechanism 216 may be separate from the actuator 100, or may be integral with the actuator 100. For example, the securing mechanism 216 may be fabricated and then overmolded into the actuator 100 at the time of actuator fabrication.

Figure 2E:
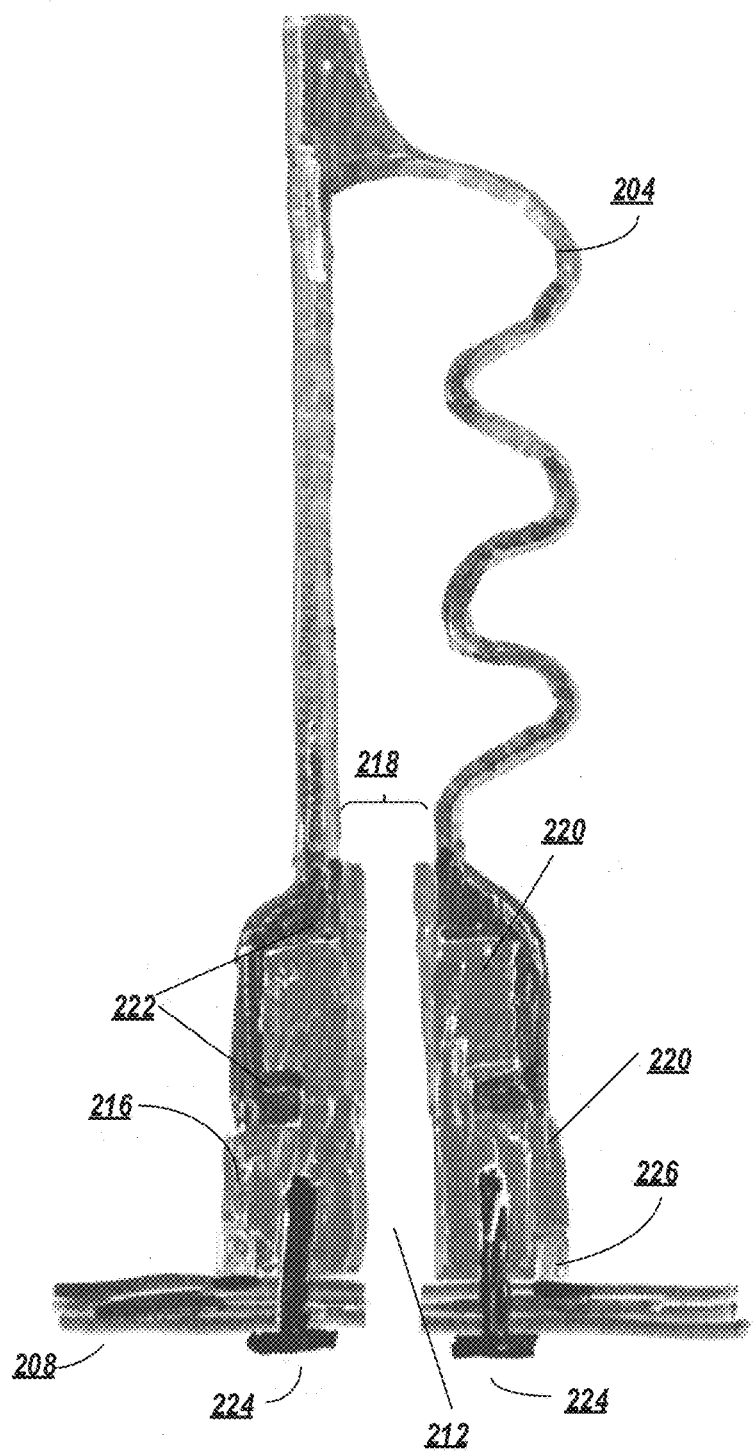

FIG. 2E depicts an exemplary overmolded insert. In this case, the extensions 220 are provided between optional upper and lower ledges 222 (if the ledges 222 are not present, the securing mechanism 216 may be secured to the actuator wall 204 using, for example, surface treatments). The securing mechanism 216 receives the fastening mechanisms 224, which pull the securing mechanism 216 towards the mounting surface 208. Advantageously, an o-ring 226 may be provided around the outer bottom edge of the securing mechanism 216. As the securing mechanism 216 is pulled tight against the o-ring 226, the o-ring 226 provides a strong seal, reducing the gap between the securing mechanism 216 and the mounting surface 208.

Furthermore, because of the shape of the relatively hard (as compared to the o-ring 226) securing mechanism 216, the securing mechanism 216 provides a hard stop for the fastening mechanism 224. For example, the o-ring 226 may be silicon or an elastomer such as a flouropolymer elastomer, whereas the securing mechanism 216 may be food-safe plastic (e.g., PETE, delrin, polyethelene, or polypropylene) or metal (e.g., stainless steel with a grade of 303, 304, or 316, or hard anodized aluminum). Because of the relatively hard or rigid nature of the securing mechanism 216, there comes a point during the tightening of the fastening mechanisms 224 when the securing mechanism 216 cannot be drawn further towards the mounting surface 208. This prevents the o-ring 226 from becoming over- or under-compressed and allows the securing mechanism 216 to be tuned (by varying the shape of the securing mechanism 216, particularly the size and configuration of the gap which seats the o-ring 226) to put a predetermined amount of force on the o-ring 226.

Traditionally, external screws or bolts are used to fix an actuator or actuator assembly to a mounting surface 208. These external fastening mechanisms create harborage points; the embodiments of FIGS. 2A-2E eliminate the external fastening mechanisms and replace them with internal fastening mechanisms to thereby reduce or eliminate these harborage points. Moreover, the interface between the actuator 100 and the mounting surface 208 may be held tight by the application of the fastening mechanisms 224, reducing the gap between the actuator 100 and the mounting surface 208 and thereby reducing harborage points.

FIGS. 3A-3E depict further examples of hub and base assemblies for affixing a robotic gripper to a robotic arm without using external fastening mechanisms like bolts or screws. These assemblies may be used in conjunction with, or as an alternative to, the assemblies of FIGS. 2A-2D.

Figure 3A:
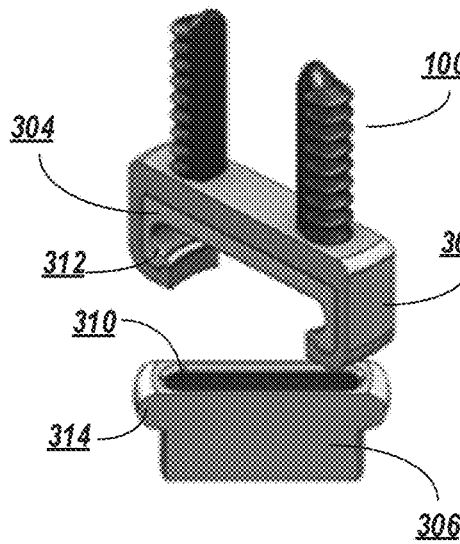
FIGS. 3A-3E depict examples of hub and base assemblies for affixing a robotic gripper to a robotic arm.
Figure 3B:
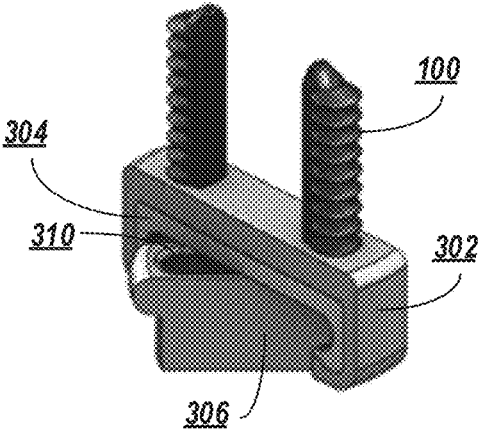
Figure 3C:
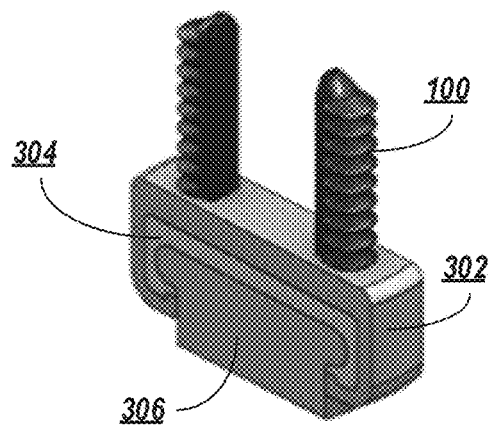

FIGS. 3A-3C depict the "twist-to-lock" nature of the hub/base assembly. The assembly includes one or more actuators 100 mounted into an actuator holder 304, which may be formed of any suitable material such as plastic or metal. An overmolded elastomer layer 302 holds the actuators 100 on the actuator holder 304 and covers crevices, corners, and other features of the actuators 100 that could serve as harborage points. For example, as shown in FIG. 3E, the overmolded elastomer layer 302 may cover the proximal end of the actuator 100 up to the ridge on the most-proximal accordion extension. A gripper base 306 includes an inflation fluid chamber 310 for distributing inflation fluid to the actuators 100. The gripper base 306 may be affixed or may be affixable to a robotic arm.

The actuator holder 304 is provided with one or more grooves 312 configured to mate with, and interlock with, corresponding extensions 314 on the gripper base 306. As shown in FIGS. 3B and 3C, the gripper assembly including the actuators 100, the overmolded elastomer layer 302, and the actuator holder 304 may be placed over the gripper base 306 and twisted to mate the extensions 314 into the grooves 312. It should be noted that the interlocking mechanism may be reversed (e.g., with grooves 312 on the gripper base 306 and extensions 314 on the actuator holder 304).

The use of an interlocking system allows for a screwless assembly, thereby removing potential harborage points. Moreover, this configuration allows the actuator holder 304 (along with the actuators 100 and the overmolded elastomer layer 302) to be easily removed from the base 306 so that the base 306 may be easily cleaned out-of-place (i.e., when the base 306 has been removed from the robotic assembly).

Figure 3D:
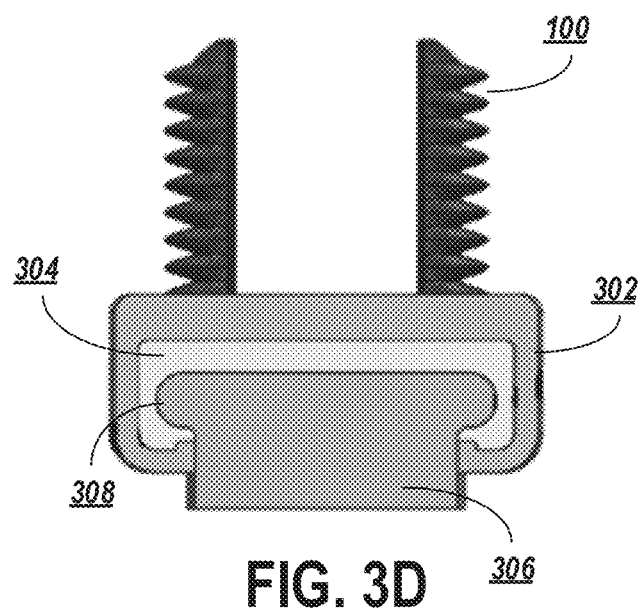
Figure 3E:
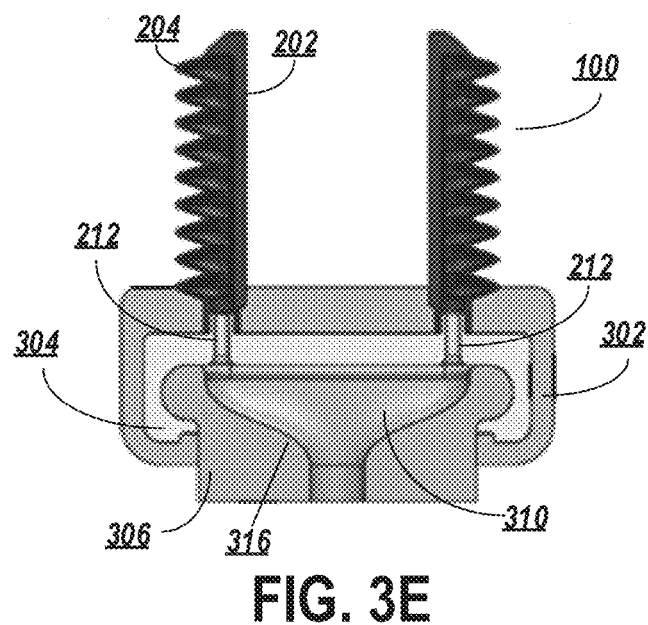

FIG. 3D shows a close up exterior view of the assembled gripper system. As shown in FIG. 3D, the interface 308 at which the gripper base 306 mates to the actuator holder 304 includes smooth, curved surfaces. Thus, both the gripper base 306 and the actuator holder 304 do not require sharp corners at the interface 308, which reduces harborage points and allows for simpler cleaning. Moreover, surfaces that may come into contact with chemical or biological material may have a smoothness value of at least 1 microinch, more preferably at least 16 microinches, and more preferably at least 32 microinches.

In general, throughout the application, and particularly in the case of internal angles, the angle between two surfaces may be at least 135°. By making these internal angles relatively open, it is easier to clean these internal surfaces (e.g., with a brush or other tool). Similarly, when a curve is used, such as in the case of the interface 308, the radius of the curve may be at least 1/32", or more preferably 1/8", or more preferably 1/4", depending on the application.

FIG. 3E shows an internal view of the various components of the gripper system. An inflation fluid chamber 310 is provided in the gripper base 306 for supplying inflation fluid to the actuators 100. An inflation fluid supply line 212 extends through the actuator holder 304, through the overmolded elastomer 302, and into the void 204 of the actuator 100. Multiple inflation fluid supply lines 212 may be provided (e.g., one for each actuator 100 in the gripper assembly). The inflation fluid supply line 212 may be configured to mate with a corresponding interface on the inflation fluid chamber 310, or may simply extend to a large opening on the inflation fluid chamber 310. Because most of the opening of the chamber 310 will be covered by the actuator holder 304, the only place for inflation fluid to escape will be into the inflation fluid supply lines 212 and into the actuators 100.

As shown in FIG. 3E, the lower walls 316 inflation fluid chamber 310 have a curved shape and relatively wide openings. Moreover, the internal surfaces of the inflation fluid chamber 310 are relatively smooth (e.g., having a smoothness value of 32 microinches or more. These features reduce harborage points, allows cleaning fluid to drain out of the base after cleaning, more readily allows access by cleaning tools such as brushes, and provide for easier visual inspection to ensure that the inflation fluid chamber 310 has been sufficiently cleaned.

FIGS. 4A-4D depict a further example of a hub according to exemplary embodiments.

Figure 4A:
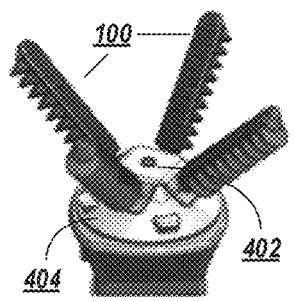
FIGS. 4A-4D depict an example of a hub having an internal fixturing mechanism according to exemplary embodiments.
Figure 4B:
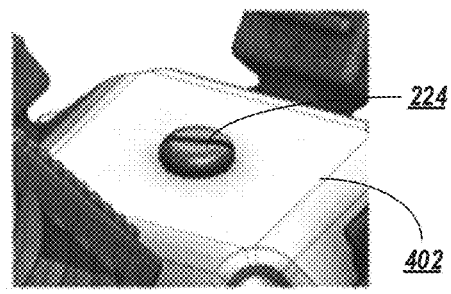

FIGS. 4A and 4B depict a hub having an external fixturing mechanism 224. As shown in FIG. 4A, a number of actuators 100 are inserted together to form a gripper. The actuators 100 are inserted into a plate 402, and the plate 402 is affixed to a robotic base 404 (e.g., a robotic arm or another structure to be fixed to a robotic arm). The plate 402 is secured to the robotic base 404 using a fixturing mechanism 224 (e.g., a screw or bolt), as shown in the closeup in FIG. 4B. The protruding fixturing mechanism 224 provides a number of harborage points for the gripper system.

Figure 4C:
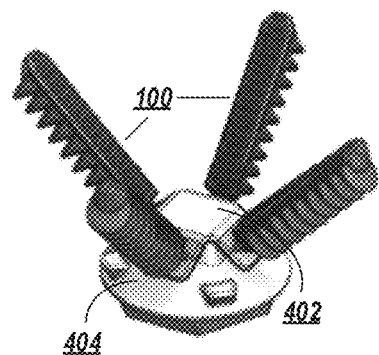
Figure 4D:
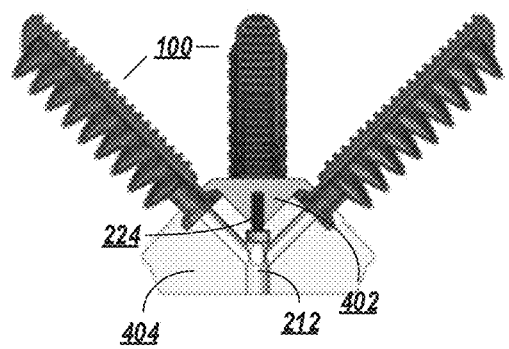

In contrast, FIG. 4C depicts a perspective view of a hub having an internal fixturing mechanism. As can be seen in this example, the plate 402 presents a flat surface with no external screws. As shown in the cross-sectional view of FIG. 4D, an internal fixturing mechanism 224 is routed through an inflation fluid supply path 212, and secures the plate 402 from the bottom.

Using the above-described hub assemblies (individually or in any combination), harborage points can be reduced or eliminated from the interconnections between the actuators/actuator holders and other parts of the system. Other harborage points may exist elsewhere, however. For example, inflation fluid may be supplied to a hub or other part of the system through an inflation fluid supply line such as a pneumatic fitting. FIGS. 5A-5H depict an example of a twist-lock inflation fluid supply line for reducing harborage points, according to an exemplary embodiment.

Figure 5A:
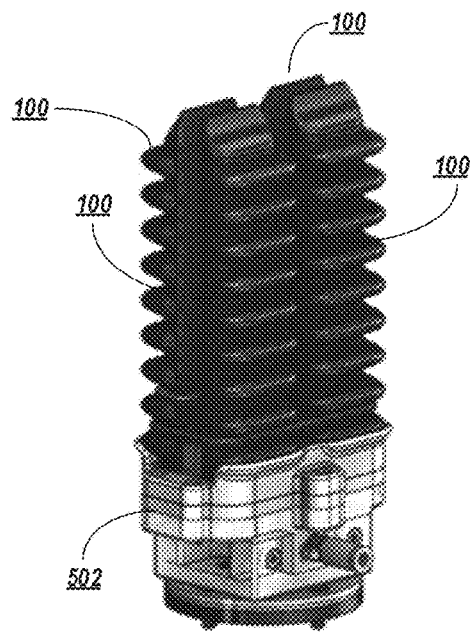
FIGS. 5A-5H depict an example of a twist-lock inflation fluid supply line, according to an exemplary embodiment.

FIG. 5A provides a perspective view of a gripper including four actuators 100 connected to an actuator holder 502. The actuator holder 502 may be mounted to a robotic arm.

Figure 5B:
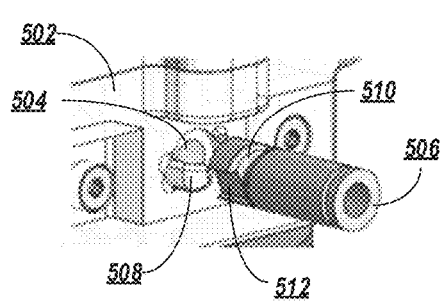

As shown in the close-up of FIG. 5B, the actuator holder 502 includes a port 504 for receiving a fitting 506 for an inflation fluid supply line. The port 504 is configured to interconnect with the fitting 506 through a twist interlock system. In this example, the port 504 includes one or more fingers 508 that mate to one or more filleted slots 510 on the fitting 506. The filleted slots 510 may be relatively wide or thick to allow for easy cleaning (thus more easily receiving a brush or other cleaning device as compared, for example, to screw threads). The internal bend 509 in the fingers 508 may have a curved or teardrop cross-sectional profile, with a curve radius of at least 1/32", or more preferably 1/16", or more preferably 1/4", in order to grip the filleted slots 510 while also remaining relatively easy to clean (as e.g., enabling easier access with a cleaning tools such as a brush).

Figure 5C:
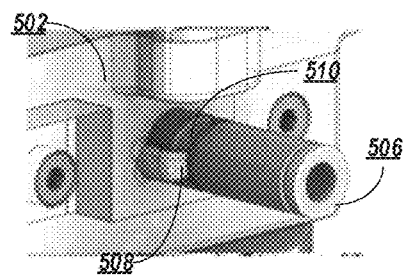

One or more grooves 512 in the fitting 506, each groove corresponding to a finger 508, provide clearance allow the fitting 506 to be pushed onto the port 504 between the fingers 508, as shown in FIG. 5C.

Figure 5D:
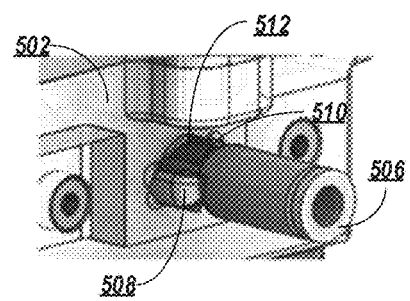

Once inserted onto the port 504, the fitting 506 may be twisted to lock the fitting 506 into place, as shown in FIG. 5D. In an exemplary embodiment, the fitting 506 may be twisted about 120° to allow for relatively simple assembly, although other degrees of twist (e.g., 90° or) 30° are also possible. In order to accommodate this amount of twisting, the grooves 510 may be shaped and configured to allow for a 120° twist. Moreover, the grooves 510 may be shaped with an upward curve so that, as the fitting 506 is twisted, the fitting 506 undergoes linear displacement towards the hub 502, thus pressing the fitting 506 into place against the hub and creating a fluid-tight seal.

Figure 5E:
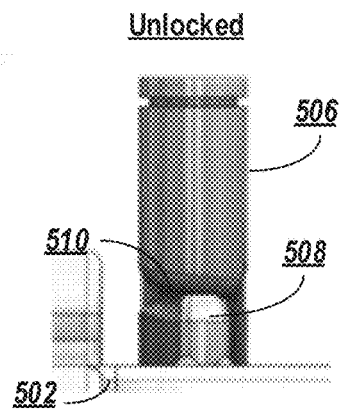
Figure 5G:
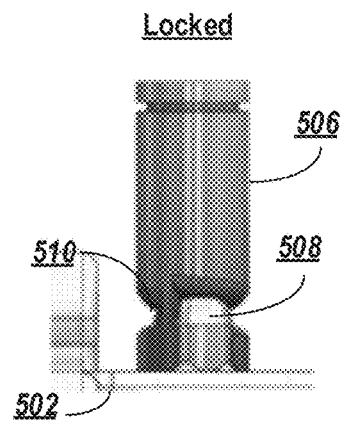
Figure 5F:
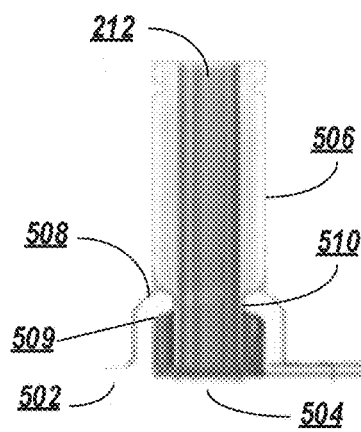
Figure 5H:
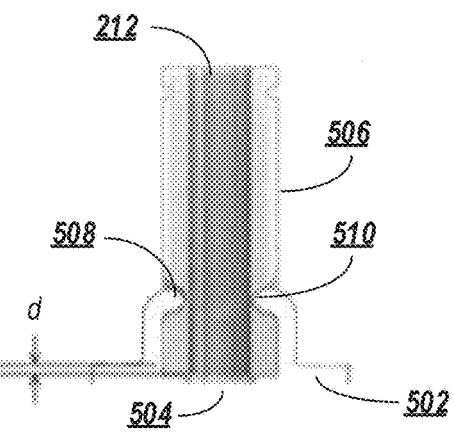

FIGS. 5E-5H depict the twisting action in more detail. FIG. 5E depicts an external view of an unlocked fitting 506 from the front, while FIG. 5H depicts an internal cross-sectional view of the unlocked fitting 506 from the side. Note that, in the unlocked configuration, a gap 514 exists between the bottom of the fitting 506 and the hub 502.

FIG. 5G depicts an external view of a locked port 504 (after twisting the port 504 to lock it in place) from the front, while FIG. 5H is an internal view of the locked port 504 from the side. By comparing FIG. 5F to FIG. 5H, it can be seen that twisting the port 504 results in an amount of linear displacement d which brings the bottom of the port 504 into contact with the hub 502.

Figure 6:
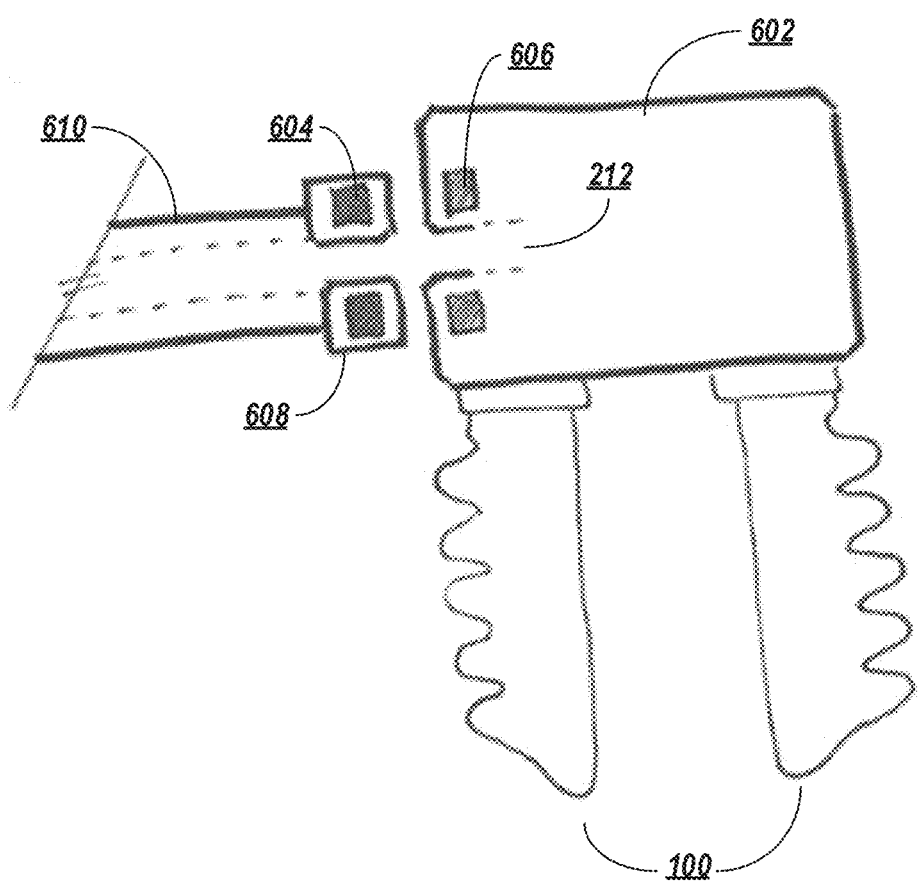
FIG. 6 depicts a magnetic attachment for an inflation fluid supply line, according to an exemplary embodiment.

Alternatively or in addition, magnets may be used to secure an inflation fluid supply line to a hub. FIG. 6 depicts a magnetic attachment for an inflation fluid supply line, according to an exemplary embodiment. In this example, a hub 602 supports two actuators 100. The hub 602 is provided with a first annular magnet 606 surrounding an inflation fluid supply path 212.

An inflation fluid supply line 610 for providing inflation fluid to the hub 602 includes a fitting 608 that incorporates a second annular magnet 604. The first annular magnet 606 and the second annular magnet 604 may have opposite polarities so that, when brought into close proximity with one another, the first annular magnet 606 mates with the second annular magnet 604 and forms a fluid-tight seal. Because the magnets 604, 606 are annular, inflation fluid flows through the hole in the magnets 604, 606 and into the hub 602, from which it can be distributed to the actuators 100.

Next, innovations in actuator design and application for handling biological or chemical materials is discussed.

Actuator Design and Application

Figure 7A:
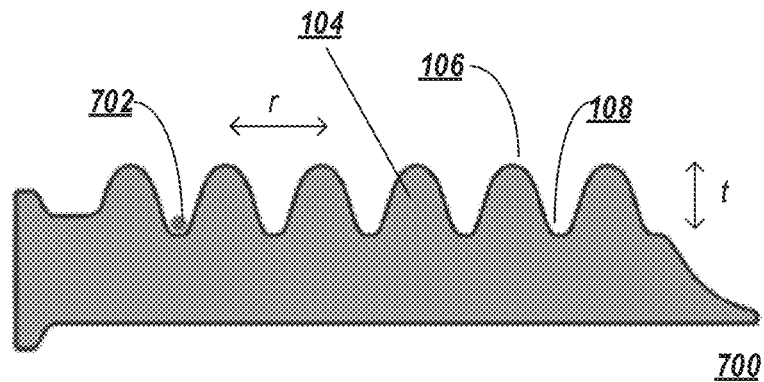
FIGS. 7A-7B depict an example of an actuator having reduced harborage points, according to an exemplary embodiment.
Figure 7B:
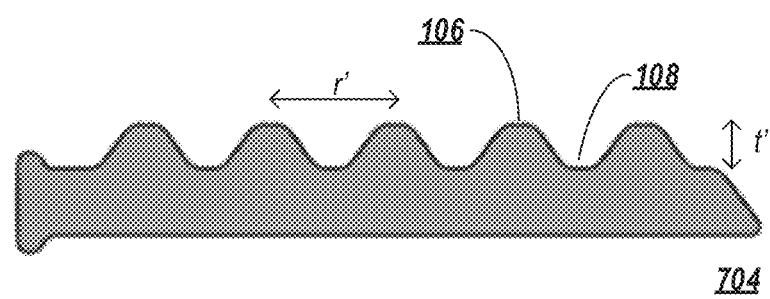

FIGS. 7A-7B depict an example of an actuator having reduced harborage points, according to an exemplary embodiment. FIG. 7A depicts a first actuator 700, in which the ridges 106 of adjacent accordion extensions 104 are separated by relatively large distances r, and the troughs 108 are relatively deep (represented by the distance t). Both the ridges 106 and the troughs 108 have relatively sharp curves or sharp corners. Particularly in the case of the troughs 108, which have interior angles into which it may be difficult to place a brush or cleaning mechanism, these curves and corners create a number of harborage points 702.

FIG. 7B depicts a modified actuator 704. In this example, the ridges 106 of adjacent accordion extensions are further apart (separated by a relatively larger distance r '), while the troughs 108 are more shallow (represented by the distance t', which is less than t). The ridges 106 and the troughs 108 have more rounded edges, with gentler curves.

As a result, edges on the actuator 704 are smoothed, reducing bacterial harborage points. Moreover, clearings on the actuator 704 are expanded, which makes it easier to clean the actuator 704 with a brush, pad, solution, etc. to remove bacteria and food debris from the actuator 704.

Figure 8A:
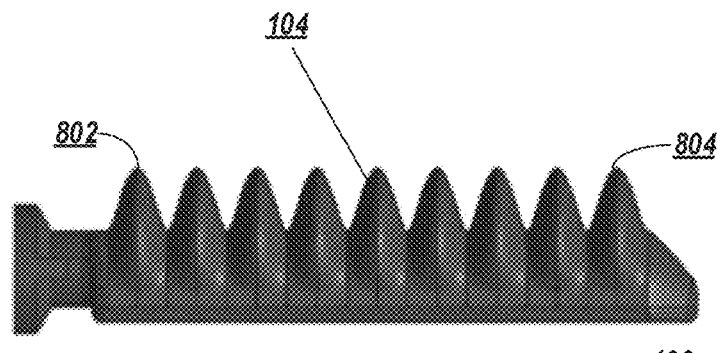
FIGS. 8A-8C depict an accordion cover for a soft actuator, according to an exemplary embodiment.
Figure 8B:
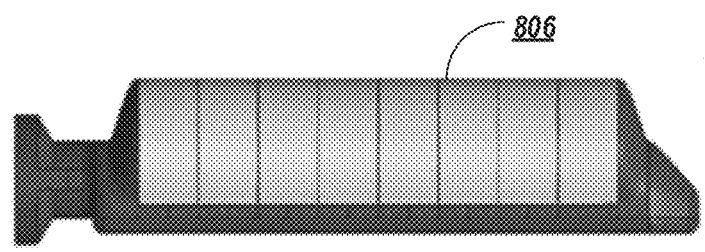
Figure 8C:
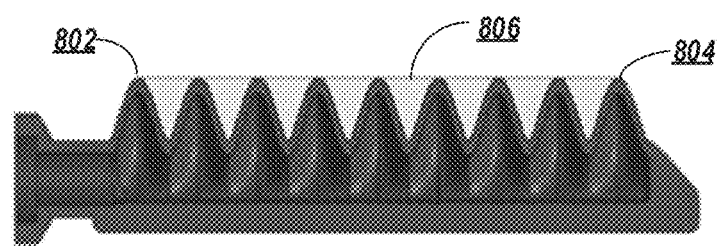

To further reduce harborage points, the accordion extensions 104 may be covered entirely so that the non-gripping side of the actuator presents a smooth or flat surface. FIGS. 8A-8C depict an accordion cover for a soft actuator, according to an exemplary embodiment.

FIG. 8A depicts an actuator 100 having a plurality of accordion extensions 104. A most-proximal accordion extension includes a starting ridge 802, and a most-distal accordion extension includes an ending ridge 804.

To eliminate or reduce harborage points between or on the accordion extensions 104, the accordion extensions 104 may be covered with an accordion cover 806, as shown in FIG. 8B. The accordion cover 806 may be formed of a highly extensible elastomer configured to readily flex when the actuator 100 is inflated with inflation fluid or subjected to a vacuum. Thus, the accordion cover 806 does not hinder the expansion or contraction of the actuator 100.

The accordion cover 806 may be removable, or may be integrated with the actuator 100. For example, the accordion cover 806 may be an elastomer that fully encases the accordion extensions 104 and fills in the areas between the accordion extensions 104.

As shown in the internal cross-sectional view of FIG. 8C, the accordion cover 806 may extend from the starting ridge 802 to the ending ridge 804. In other embodiments, the accordion cover 806 may extend beyond the starting ridge 802 and/or the ending ridge 804. Alternatively or in addition, the accordion cover 806 may cover some, but not all, of the accordion extensions 104.

Figure 9:
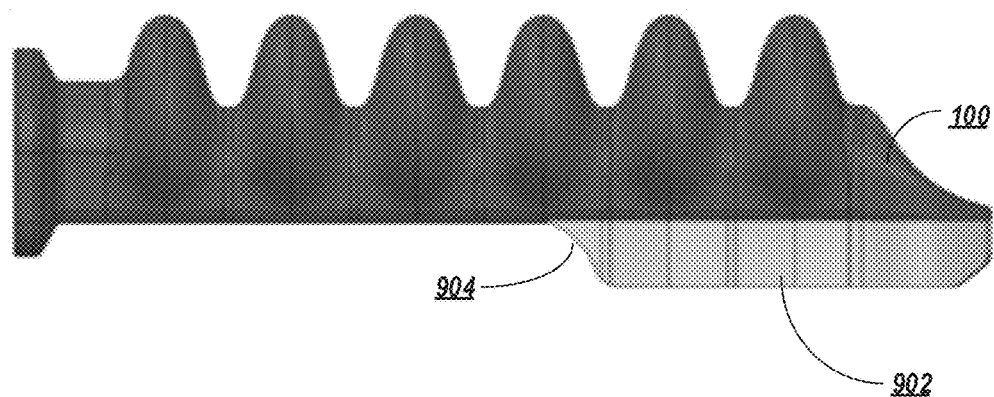
FIG. 9 depicts an example of an overmolded soft gripping pad, according to an exemplary embodiment.

The gripping surface of the actuator 100 may also be supplemented. For example, FIG. 9 depicts an example of an overmolded soft gripping pad 902, according to an exemplary embodiment. The soft gripping pad 902 is provided on at least a portion of the gripping surface of the actuator 100. The soft gripping pad 902 may be integral with the actuator 100, or may be a separate part that is affixed to the actuator 100 (e.g., using elastomeric bands), allowing the pad 902 to be removed for separate cleaning.

The soft gripping pad 902 may be formed of a soft elastomeric material (e.g., an elastomeric material that is relatively more flexible, pliable, or yielding to a force than the elastomeric material from which the actuator 100 is formed) and may allow the actuator 100 to manipulate delicate objects, such as tomatoes, without bruising the objects' surface.

An interface 904 between the gripping pad 902 and the base 102 of the actuator 100 is curved to reduce or eliminate a potential harborage point.

In further embodiments, the gripping surface of the actuator 100 may be provided with other types of texturing that are readily cleaned. For example, FIGS. 10A-10C depict cross-sectional side views of actuators having inflatable texturing surfaces, according to exemplary embodiments.

Figure 10A:
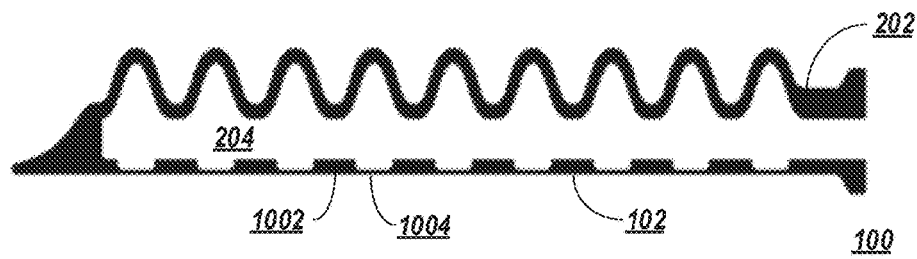
FIGS. 10A-10C depict examples of inflatable texturing surfaces, according to exemplary embodiments.

FIG. 10A depicts an actuator 100 in an uninflated state. The actuator 100 includes a wall 202 surrounding a void 204 into which inflation fluid may be supplied. On the base 102 of the actuator, the thickness of the wall 202 varies between alternating thick-walled portions 1002 and thin-walled portions 1004. The thin-walled portions 1004 have a thickness that is relatively smaller than the thick-walled portions 1002.

In the uninflated state, the base 102 of the actuator 100 is flat. Thus, when not inflated, the actuator exhibits fewer or no harborage points on the base 102 that forms the gripping surface, and can be readily cleaned.

Figure 10B:
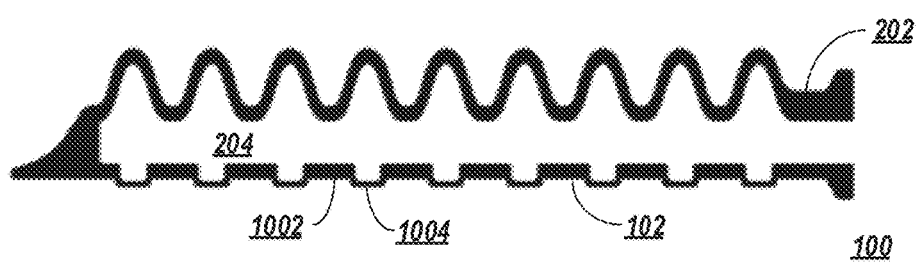
Figure 10C:
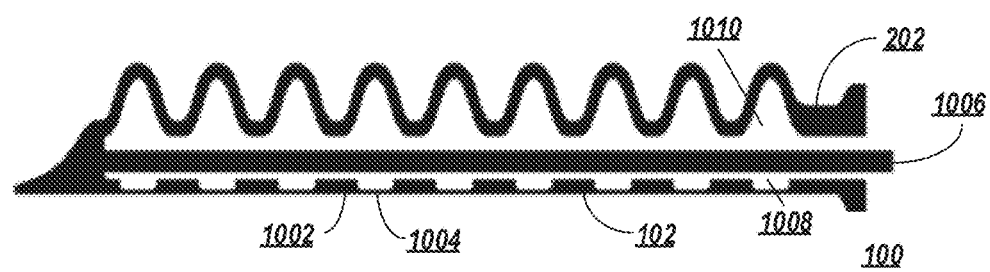

However, when inflated (as shown in FIG. 10B), the inflation fluid enters the void 204 and presses against the external walls 202 of the actuator. Because the thin-walled portions 1004 are less rigid or resistant to inflation than the thick-walled portions 1002, the thin-walled portions 1004 may bow out, creating a textured base 102. Thus, the actuator 100 may more readily grip an object. When the inflation fluid is removed, the thin-walled portions 1004 return to their flat configuration and the base 102 becomes smooth again, for easy cleaning.

Note that FIG. 10B depicts the base 102 in a textured configuration (implying the presence of inflation fluid in the void 204), although the actuator 100 is in an unbent configuration. In real-world scenarios, applying inflation fluid would typically cause the actuator 100 to bend, as shown in FIG. 1A; the bending is not shown in FIG. 10B for ease of understanding.

Instead of the thin-walled portions 1004 and the thick-walled portions 1002, the base 102 may be formed of alternating materials of different types that are more or less resistant to expansion upon inflation. When inflated, the portions of the base 102 with less resistant materials will expand more than the portions of the base 102 with more resistant materials, creating a textured surface.

Moreover, a similar effect may be achieved by applying a vacuum instead of inflation fluid. For example, the thin-walled portions 1004 may be configured to be in an extended configuration by default. Upon application of a vacuum, the thin-walled portions 1004 may bow inwards, creating a flat surface.

FIG. 10C depicts an alternate configuration in which the texturing of the base may be applied independently of inflation of the actuator 100. In this example, an internal wall 1006 separates the void 204 into two chambers. A first chamber 1008 exists in the area adjacent to the base 102, while a second chamber 1010 fills the remainder of the actuator 100. The two chambers 1008, 1010 may be inflated independently of one another. When the first chamber 1008 is filled, the thin-walled portions 1004 bow outwards, creating a textured surface on the base 102. When the second chamber 1010 is filled, the actuator 100 bends according to its inflation profile in order to grasp a target.

In addition to providing systems that reduce harborage points, it may also be useful when working with biological or chemical materials to use special purpose actuators well-suited to contexts in which these materials are often handled.

Figure 11A:
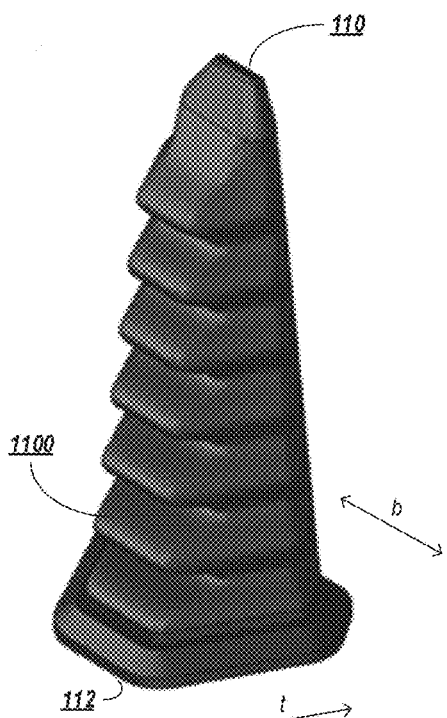
FIGS. 11A-11D depict an exemplary tapered soft actuator.
Figure 11B:
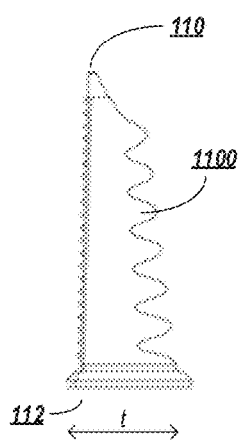
Figure 11C:
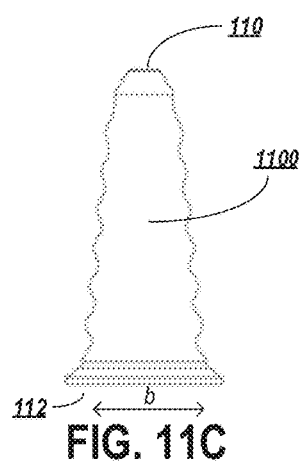
Figure 11D:
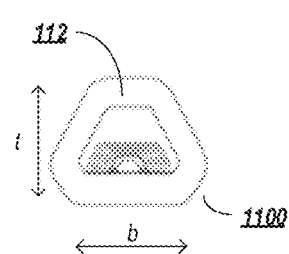

For example, FIGS. 11A-11D depict an exemplary tapered soft actuator 1100. FIG. 11A depicts a perspective view of the tapered actuator 1100, while FIGS. 11B, 11C, and 11D depict side, front, and bottom views, respectively. As shown in these Figures, the actuator 1100 tapers both in thickness (t) and in breadth (b) from the proximal end 112 to the distal end 110.

It is noted that the tapered actuator 1100 need not necessarily taper uniformly across or along the actuator 1100. For example, different effects may be achieved by utilizing different relative degrees of taper along the width, length, or wall thickness of the actuator, or by tapering the amplitude of respective accordions, resulting in an alteration of lateral actuator stability, axial finger stability, gradient changes in expansion when actuated, or gradient changes in curvature response when actuated, respectively.

A tapered actuator 1100 is exceptionally stable in torsion, has a large surface area for friction-dominated grasp, maintains small and dexterous finger tips for manipulation of small items, and delivers relatively higher grasping force per the same pressure as compared to an actuator having a homogeneous cross-section. This allows tapered actuators 1100 to be deployed in tandem with each other, for example in a circular or rectangular pattern, for precision handling of a range of object sizes and weights. Moreover, tapered actuators 1100 are particularly well-suited to manipulating wet, slippery, oddly/irregularly shaped, and cluttered food items (e.g., food items in a heap or in form fitting packaging).

Moreover, a tapered actuator 1100 may be better able to navigate cluttered environments as compared to a non-tapered actuator (e.g., bushels of unstructured fruit or produce).

Figure 12A:
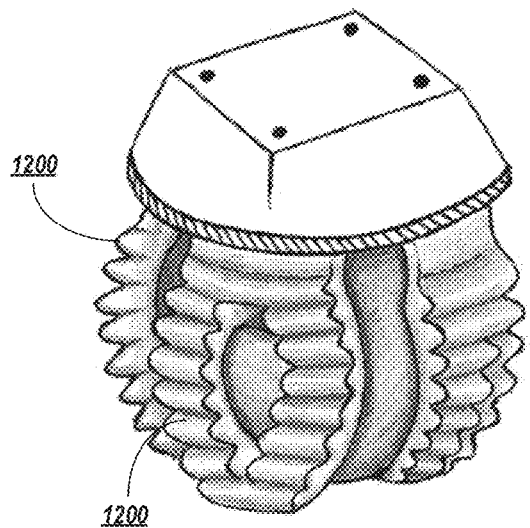
FIGS. 12A-12D depict an exemplary spherically enveloping gripper.
Figure 12B:
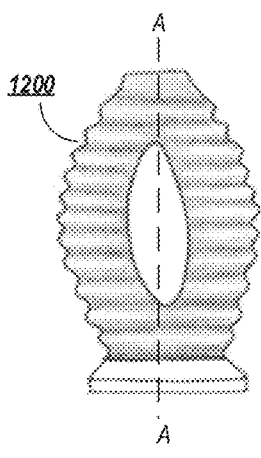
Figure 12C:
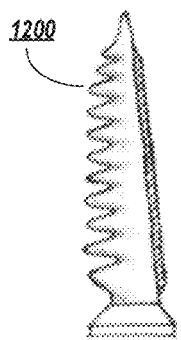
Figure 12D:
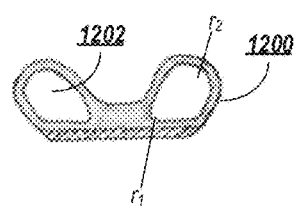

For example, FIGS. 12A-12D depict an exemplary spherically enveloping gripper employing skewed actuators 1200. These leaf-shaped skewed actuators 1200 are well-suited to fully enclosing fragile objects. FIG. 12A depicts a perspective view of a gripper employing four skewed actuators 1200, whereas FIGS. 12B, 12C, and 12D depict front, side, and bottom views of the a single actuator 1200, respectively.

As can be seen in FIG. 12D (bottom view), the skewed actuator 1200 includes a plurality of skewed internal chambers 1202 for receiving inflation fluid. The skewed chambers 1202 have a teardrop or other skewed shape that expands from a relatively narrow region $r_1$ to a relatively wider region $r_2$. The relatively narrow $r_1$ region may be disposed close to the center of the skewed actuator 1200 (e.g., the portion of the internal chamber 1202 that is closest to the centerline A-A, as shown in FIG. 12B), whereas the relatively wider region $r_2$ may be disposed towards the external edge of the skewed actuator 1200, away from the centerline A-A.

The skewed actuators 1200 have a number of characteristics.

First, each skewed actuator 1200 has multiple degrees of freedom when actuated. In other words, the skewed actuators 1200 bend about its major axis (e.g., around the central axis to curve in the circumferential direction as depicted in FIGS. 1A and 1B) as well as across its minor axis (in the axial direction of FIGS. 1A and 1B).

Second, the skewed actuator 1200 has a relatively broad leaf-like shape which tends to form a completely enclosing sphere when matched with other tapered actuators 1200 in a circularly- or rectangularly-patterned layout.

Third, the tapered design of the skewed actuator 1200 improves stability and increases grasping force. These properties make such an actuator well-suited to manipulating, for example, many types of roughly round fruits and vegetables. Because the skewed actuator 1200 encompasses an object (referred to herein as providing a "caging" grip), the skewed actuator 1200 may allow the skewed actuator 1200 to, for example, pick delicate fruit from a tree (e.g., apples) or vine (e.g., tomatoes or grapes). A task such as fruit picking may require a stronger grip than, for example, simply moving picked fruit from one location to another. Because a stronger grip is required, if the grip is focused in a few locations (e.g., at the fingertips of the actuators), then the fruit can be bruised or damaged. By applying a caging grip, this force may be distributed over a larger surface area, which improves the chances of picking the fruit without bruising it.

Figure 13A:
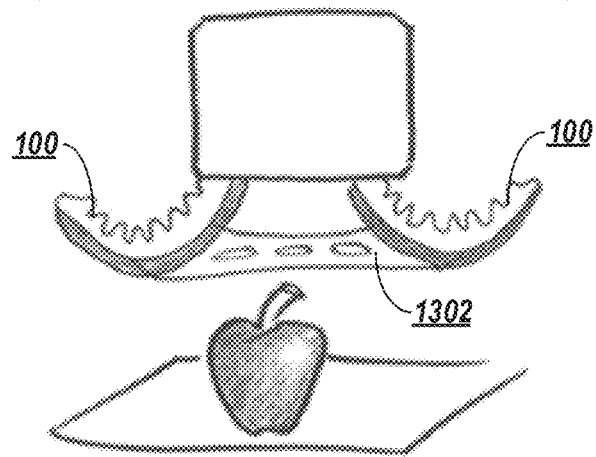
FIGS. 13A-13B depict exemplary webbing applied between actuators.
Figure 13B:
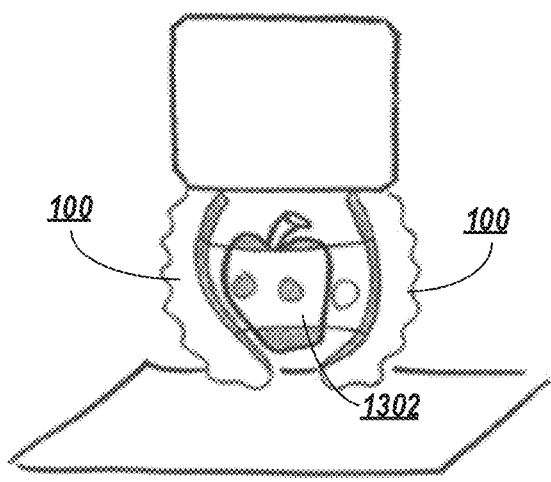

Objects may be fully encompassed or encapsulated by other methods as well. For example, FIGS. 13A-13B depict webbing 1302 applied between actuators 100 in order to allow the actuators 100 to fully encapsulate objects. The webbing 1302 may be formed of relatively extensible elastomeric material to allow the webbing to expand while the actuators 100 are in an open state (FIG. 13A), while maintaining a reasonable amount of tension when the actuators 100 are in a closed state (FIG. 13B), so as to maintain the grasped object within the webbing 1302. The use of webbing 1302 allows for increased surface area contact between a gripper and an object.

Figure 14A:
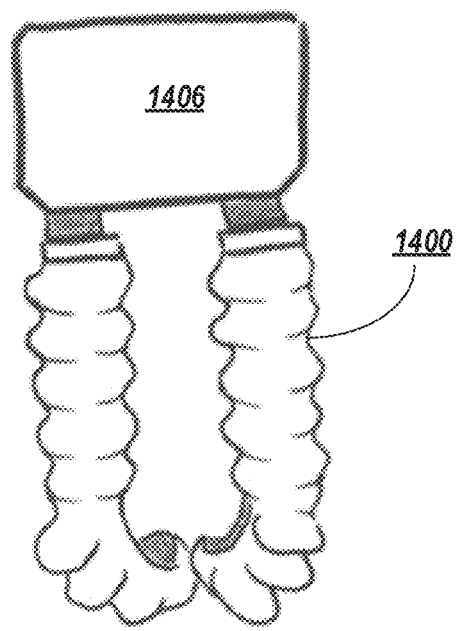
FIGS. 14A-14B depict exemplary extend-and-grasp actuators.
Figure 14B:
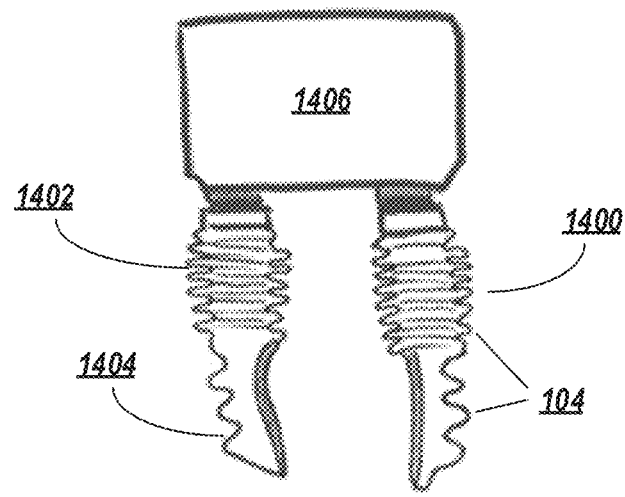

In some cases, an object to be grasped may be located deep within a container, such as a bin, where the object may be difficult to reach. FIGS. 14A-14B depict exemplary extend-and-grasp actuators suitable for these and other applications.

FIG. 14A depicts an inflated extensible actuator 1400, while FIG. 14B depicts an uninflated extensible actuator 1400. The extensible actuator 1400 includes a number of accordion extensions 104 divided into two sections. A full accordion section 1402 includes accordion extensions 104 that extend around a full diameter of the extensible actuator 1400. A partial accordion section 1404 includes accordion extensions 104 that extend only part way around the diameter of the extensible actuator 1400. The full accordion section 1402 may include accordion extensions 104 at a higher frequency or rate than the partial accordion section 1404.

As a result, when the extensible actuator 1400 is inflated, at a relatively low inflation pressure the full accordion section 1402 begins to extend (under a relatively small amount of force). This causes the extensible actuator 1400 to extend linearly, with a relatively small degree of curvature at the distal end, which allows the extensible actuator 1400 to (for example) reach into a bin or container that might otherwise be blocked by the actuator's hub assembly 1406. At relatively high inflation pressure, the partial accordion section 1404 exhibits increasing degrees of curvature, allowing the extended actuator to grasp an object.

In further embodiments, an actuator may employ a special geometry in order to better grasp particular targets. For example, FIG. 15A-15D depict an actuator incorporating a hook, according to an exemplary embodiment.

Figure 15A:
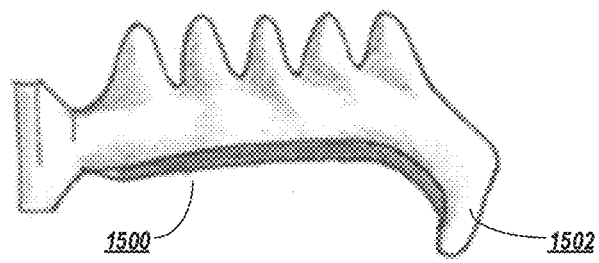
FIG. 15A-15D depict an actuator incorporating a hook, according to an exemplary embodiment.
Figure 15B:
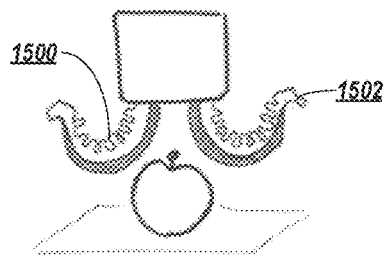
Figure 15C:
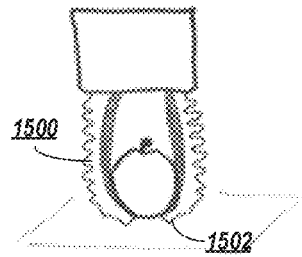
Figure 15D:
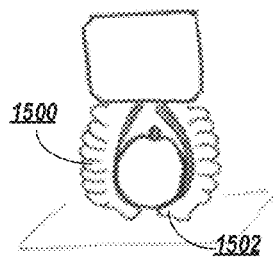

As shown in FIG. 15A, the hooked actuator 1500 includes a curved protrusion 1502 at its distal end in the shape of a hook. Accordingly, when the hooked actuator 1500 is inflated in order to grasp an object (FIGS. 15B, 15C, and 15D, showing varying degrees of inflation pressure), the curved protrusion 1502 of the hooked actuator 1500 extends underneath the object to be grasped (FIG. 15C), subsequently pulling the object inward (FIG. 15D). This allows for greater contact with the gripping surface of the hooked actuator 1500, and improves the stability of the object while it is being moved or manipulated.

Regardless of the type of actuator used, it may be helpful in some scenarios to increase the opening between actuators prior to grasping a target. For example, when grasping a large object, a relatively large opening angle may be called for. When grasping a small object, a relatively small opening angle may be called for.

Figure 16A:
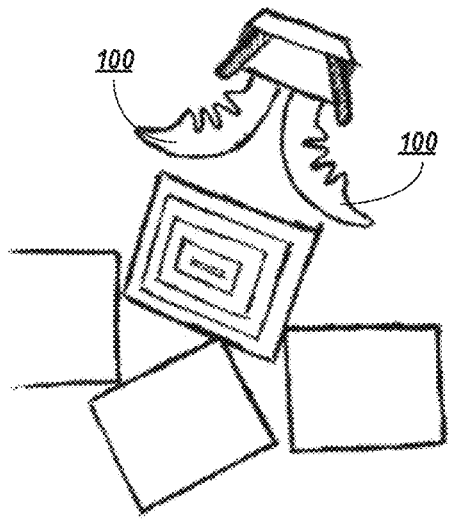
FIGS. 16A-16B depict examples of different degrees of vacuum applied to an actuator to modify the actuator's opening profile.
Figure 16B:
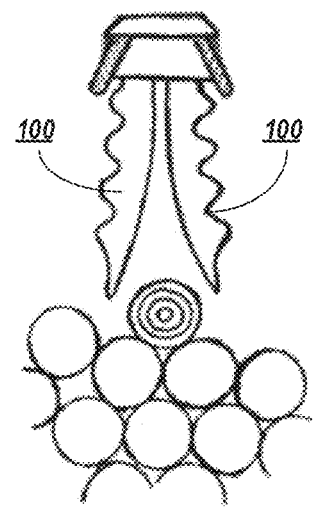

To achieve different degrees of opening, vacuum may be applied to the actuator (e.g., instead of filling the actuator with an inflation fluid, ambient fluid in the actuator may be removed from the actuator). For instance, FIGS. 16A-16B depict examples of different degrees of vacuum applied to actuators 100 to modify the actuators' opening profile. FIG. 16A depicts a relatively large opening angle achieved by applying a relatively large amount of vacuum to the actuators 100. FIG. 16B depicts a relatively small opening angle achieved by applying a relatively smaller (or no) amount of vacuum.

In some embodiments, a robotic system is configured to provide a precise, predetermined amount of vacuum to one or more actuators 100. The predetermined amount may be selected in an amount that accommodates the environment in which the actuator 100 is intended to operate and the size or configuration of the object that the actuator 100 is intended to grasp. For example, if too little vacuum is applied, the actuator 100 will not open sufficiently to grasp the target. On the other hand, if too much vacuum is applied, the actuator 100 will open more widely than is necessary, which may cause the actuator 100 to collide with the container holding the target object and/or other objects near the target object. This is especially true in cluttered environments. By providing a predetermined amount of vacuum, the actuator 100 can be opened enough to allow the target object to be grasped while still providing sufficient space between the actuator and adjacent objects or containers.

Robotic System Covering

In a further embodiment, the system may be made easier to clean by applying a food-safe or medically-safe wrapping around some or all of a robotic system. For example, FIGS. 17A-17C depict an exemplary disposable wrapping for a robotic system 1700.

Figure 17A:
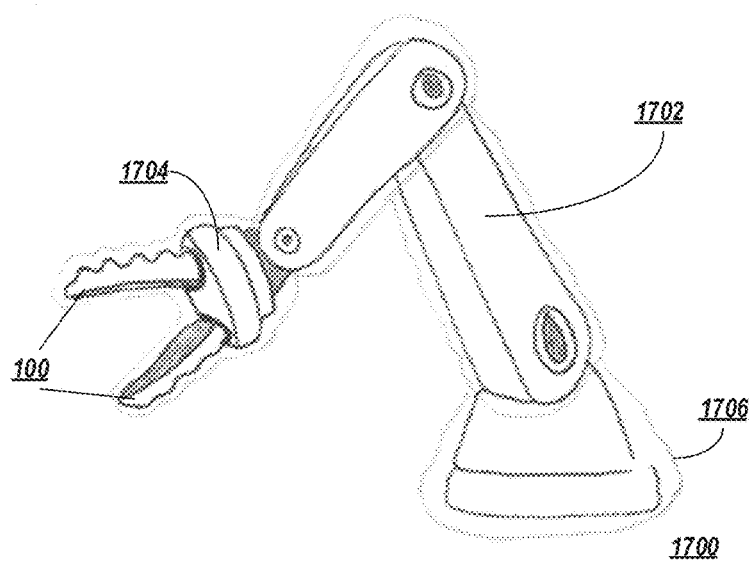
FIGS. 17-17C depict an exemplary disposable wrapping for a robotic system.
Figure 17B:
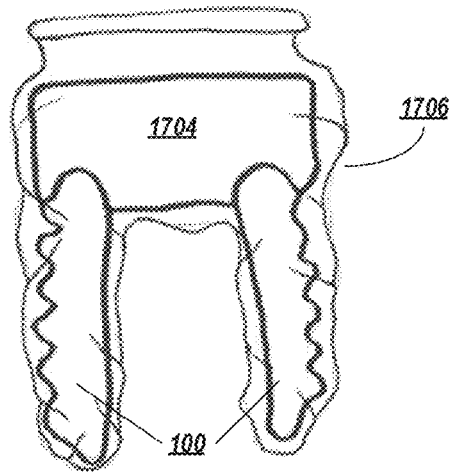

As shown in FIG. 17A, the robotic system 1700 includes a robotic arm 1702 to which a hub 1704 is mounted. Actuators 100 are connected to the hub 1704. A disposable wrapping 1706, which is sized and shaped to correspond to the robotic system 1700, is provided around the robotic system 1700.

Figure 17C:
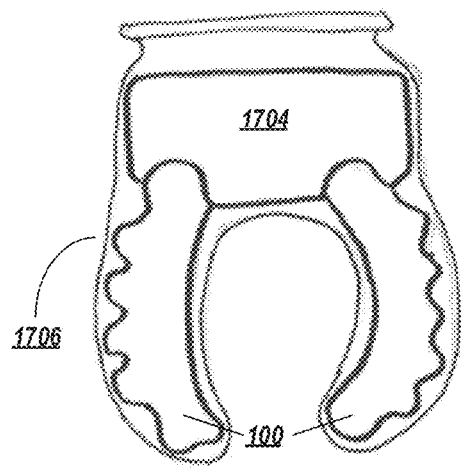

The disposable wrapping 1706 is sized and shaped to be relatively loose when the actuators 100 are in an uninflated state (FIG. 17B) and relatively tighter (without risking breakage of the disposable wrapping 1706) when the actuators 100 are in an inflated state (FIG. 17C). For example, the size and shape of the bag may be selected so as to provide a predetermined amount of slack when the actuators 100 are uninflated. When the actuators 100 are inflated, the slack is reduced and the actuators 100 may grip a target object. Alternatively or in addition, the disposable wrapping 1706 may be formed of elastic materials in order to allow the disposable wrapping 1706 to compensate for inflation of the actuators 100.

It is noted that the wrapping 1706 need not necessarily be disposable. In some embodiments, the wrapping 1706 may be capable of removal for cleaning, and may be re-used once cleaned.

Using the above-described embodiments, individually or in combination with each other, biological and chemical materials may be more readily handled by robotic systems. The described embodiments reduce biological/chemical/bacterial harborage points, allow for easy cleaning, and improve the grasping and reaching capabilities of grippers, among other advantages.

The invention claimed is:

1. A robotic system comprising:
   a soft actuator comprising an elastomeric bladder configured to receive an inflation fluid;
   a securing mechanism comprising a body and one or more extensions, the one or more extensions configured to be received in one or more corresponding recesses of the elastomeric bladder and to be gripped within the recesses upon application of a tightening force to seal the inflation fluid in the soft actuator; further comprising a base having one or more rounded fingers from gripping an inflation fluid supply line.

2. The robotic system of claim 1, wherein the securing mechanism further includes an inflation fluid supply passage for supplying inflation fluid to the soft actuator.

3. The robotic system of claim 1, wherein the one or more extensions comprise fastening passages for receiving one or more fasteners.

4. The robotic system of claim 1, wherein the inflation fluid supply line comprises one or more filleted slots for interlocking with respective rounded fingers of the base.

5. The robotic system of claim 1, further comprising a hub for holding a plurality of soft actuators, the hub held in place using an internal fastening mechanism and presenting a smooth outer surface.

6. The robotic system of claim 5, wherein the internal fastening mechanism attaches to the hub through an inflation fluid supply line.

7. The robotic system of claim 1, wherein the soft actuator further comprises an overmolded soft gripping pad covering at least a proximal end of a gripping surface of the soft actuator.

8. The robotic system of claim 1, wherein the soft actuator comprises a molded hook disposed at a distal end of the soft actuator.

9. The robotic system of claim 1, wherein the soft actuator comprises a plurality of accordion extensions, and further comprising: an extensible accordion extension cover configured to encase the accordion extensions and flex with the soft actuator, the extensible accordion cover presenting a smooth outer surface.

10. The robotic system of claim 1, wherein the soft actuator comprises a plurality of accordion extensions, the soft actuator including: a full accordion section in which the accordion extensions extend around a diameter of the soft actuator; and a partial accordion section in which the accordion extensions extend only part way around the diameter of the soft actuator.

11. The robotic system of claim 10, wherein the full accordion section includes accordion extensions at a higher frequency than the partial accordion section.

12. The robotic system of claim 1, further comprising a robotic arm to which the soft actuator is affixed, and a disposable wrapping sized and shaped to surround the robotic arm and the soft actuator.

\* \* \* \* \*